United States Patent
Lee et al.

(10) Patent No.: US 10,081,247 B2
(45) Date of Patent: Sep. 25, 2018

(54) SYSTEM, METHOD AND APPARATUS FOR PROTECTING OBC OUTPUT TERMINAL

(71) Applicant: Hyundai Motor Company, Seoul (KR)

(72) Inventors: Dong Jun Lee, Gyeonggi-do (KR); Jee Heon Kim, Gyeonggi-do (KR); Won Kyoung Choi, Gyeonggi-do (KR); Mu Shin Kwak, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 280 days.

(21) Appl. No.: 14/950,620

(22) Filed: Nov. 24, 2015

(65) Prior Publication Data

US 2017/0106753 A1    Apr. 20, 2017

(30) Foreign Application Priority Data

Oct. 19, 2015 (KR) .................. 10-2015-0145137

(51) Int. Cl.
  B60L 11/18   (2006.01)
  B60L 3/00    (2006.01)
  B60L 3/12    (2006.01)

(52) U.S. Cl.
  CPC ............ B60L 3/0046 (2013.01); B60L 3/12 (2013.01); B60L 11/1809 (2013.01)

(58) Field of Classification Search
  None
  See application file for complete search history.

(56) References Cited

U.S. PATENT DOCUMENTS

| 7,443,143 | B2 | 10/2008 | Sasaki et al. | |
|---|---|---|---|---|
| 2012/0091953 | A1 | 4/2012 | Paryani et al. | |
| 2015/0091377 | A1* | 4/2015 | Namou | B60L 11/1851 307/10.1 |
| 2016/0084917 | A1* | 3/2016 | Nam | G01R 31/3655 324/432 |
| 2016/0096441 | A1* | 4/2016 | Lee | B60L 11/1838 320/138 |
| 2016/0141897 | A1* | 5/2016 | Kim | H02J 7/0026 320/112 |

FOREIGN PATENT DOCUMENTS

| JP | 2011-015581 A | 1/2011 |
|---|---|---|
| JP | 2011-019309 A | 1/2011 |
| KR | 10-2006-0016455 A | 2/2006 |
| KR | 10-2012-0005746 A | 1/2012 |
| KR | 2013-0025535 A | 3/2013 |
| KR | 2014-0132567 A | 11/2014 |

* cited by examiner

*Primary Examiner* — Jared Fureman
*Assistant Examiner* — Aqeel Bukhari
(74) *Attorney, Agent, or Firm* — Mintz Levin Cohn Ferris Glovsky and Popeo, P.C.; Peter F. Corless

(57) ABSTRACT

A system for protecting the output terminal of the on-board-charger (OBC) includes: the OBC configured to apply an output voltage equal to a voltage of a battery to the battery to perform charging of the battery, an output terminal protection apparatus configured to compare a voltage difference between the output voltage of the OBC and the voltage of the battery with a threshold, and an OBC relay configured to connect the OBC to the battery when the voltage difference is less than the threshold. The OBC performs the charging of the battery after the OBC is connected to the battery.

13 Claims, 3 Drawing Sheets

SYSTEM, METHOD AND APPARATUS FOR PROTECTING OBC OUTPUT TERMINAL

CROSS-REFERENCE TO RELATED APPLICATION

This application claims the benefit of and priority to Korean Patent Application No. 10-2015-0145137, filed on Oct. 19, 2015, which is hereby incorporated by reference as if fully set forth herein.

BACKGROUND OF THE DISCLOSURE

Technical Field

The present disclosure relates generally to vehicular technologies and, more particularly, to a system, method and apparatus for preventing damage caused at an output terminal of an on-board-charger (OBC) mounted in a vehicle.

Discussion of the Related Art

Typically, an on-board-charger (OBC) is mounted in electric vehicles (EVs) and plug-in hybrid vehicles (PHEVs). The OBC refers to an apparatus for receiving electric energy (e.g., AC voltage) from electric vehicle supply equipment (EVSE) and charging a high-voltage battery via an in-cable control box (ICCB).

The OBC performs charging after connecting the output terminal thereof to the high-voltage battery of the vehicle. When the OBC does not perform charging, the high voltage of the OBC is cut off using a relay, for user safety.

When the OBC and the high-voltage battery are connected in order to perform charging, surge voltage and current may be generated by a parasitic inductor component on a high-voltage path and the capacitor of the output terminal of the OBC due to a voltage difference across a relay. Thus, hardware damage may be caused in the output terminal of the OBC.

A conventional method for solving the above-described problem involves decreasing a voltage difference between the output voltage of the OBC and the voltage of the high-voltage battery using a pre-charge resistor. However, charging may be restricted when the capacitor of the input terminal of another high-voltage part is not discharged. Accordingly, there is a need for a method of decreasing surge voltage and current by controlling the voltage of the output terminal of the OBC without the pre-charge resistor.

SUMMARY OF THE DISCLOSURE

Accordingly, the present disclosure is directed to a system, method and apparatus for preventing damage caused at an output terminal of an on-board-charger (OBC) mounted in a vehicle that substantially obviate one or more problems due to limitations and disadvantages of the related art.

An object of the present disclosure is to provide a system, method and apparatus for protecting the output terminal of an on-board-charger (OBC). More specifically, an object of the present disclosure is to provide a system, method and apparatus for protecting the output terminal of an OBC by balancing the output voltage of the OBC and the voltage of a high-voltage battery to decrease surge voltage and current.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a system for protecting an output terminal of an on-board-charger (OBC) includes: the OBC configured to apply an output voltage equal to a voltage of a battery to the battery to perform charging of the battery; an output terminal protection apparatus configured to compare a voltage difference between the output voltage of the OBC and the voltage of the battery with a threshold; and an OBC relay configured to connect the OBC to the battery when the voltage difference is less than the threshold. The OBC performs the charging of the battery after the OBC is connected to the battery.

The battery may include a main relay, and the output voltage of the OBC may be applied to the battery by driving the main relay.

The system may further include a battery management system (BMS) configured to transmit information about the voltage of the battery to the output terminal protection apparatus.

The battery may include a pre-charge resistor, a pre-charge relay, and a main relay, and the pre-charge relay is closed before closing the main relay.

Furthermore, according to embodiments of the present disclosure, there is provided a method of protecting an output terminal of an on-board charger (OBC) including: comparing, by an output terminal protection apparatus of the OBC, a voltage difference between an output voltage of the OBC and a voltage of a battery with a threshold; driving an OBC relay to connect the OBC to the battery when the voltage difference is less than the threshold; and charging, by the OBC, the battery after the OBC is connected to the battery.

The battery may include a main relay, and the output voltage of the OBC may be applied to the battery by driving the main relay.

The method may further include transmitting, by a battery management system (BMS), information about the voltage of the battery to the output terminal protection apparatus, before the comparing of the voltage difference with the threshold.

The battery may include a pre-charge resistor, a pre-charge relay, and a main relay, and the pre-charge relay may be closed before closing the main relay.

Furthermore, according to embodiments of the present disclosure, there is provided an output terminal protection apparatus of an on-board-charger (OBC) including: a communication unit configured to receive information about an output voltage of the OBC and receive information about a voltage of a battery; and a determination unit configured to calculate a voltage difference between the output voltage and the voltage of the battery and compare the voltage difference with a threshold. The communication unit is further configured to transmit a relay control signal to drive an OBC relay to connect the OBC to the battery when the voltage difference is less than the threshold.

The battery may include a main relay configured to apply the output voltage of the OBC to the battery, and the communication unit may be further configured to transmit a driving signal to the main relay.

The communication unit may be further configured to receive the information about the voltage of the battery from a battery management system (BMS).

The battery may include a pre-charge resistor, a pre-charge relay, and a main relay, and the pre-charge relay is closed before closing the main relay.

Furthermore, according to embodiments of the present disclosure, there is provided a non-transitory computer readable medium containing program instructions for protecting an output terminal of an on-board charger (OBC) including: program instructions that compare a voltage difference between an output voltage of the OBC and a voltage of a battery with a threshold; program instructions that drive an OBC relay to connect the OBC to the battery when the voltage difference is less than the threshold; and program instructions that charge the battery after the OBC is connected to the battery.

The aspects of the present disclosure are only a part of the embodiments of the present disclosure, and various embodiments based on technical features of the present disclosure may be devised and understood by one of ordinary skill in the art based on the detailed description of the present disclosure.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
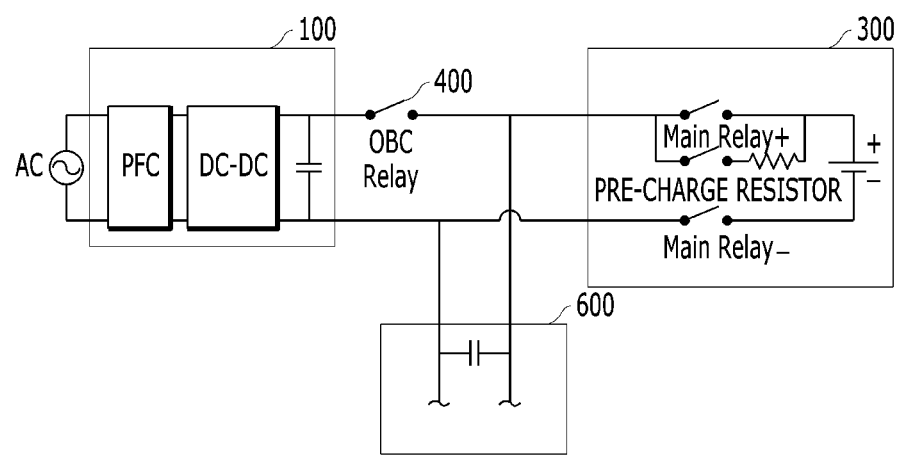
FIG. 1 is a diagram illustrating a conventional system for protecting the output terminal of a on-board-charger (OBC)

Hereinafter, various apparatuses and methods according to the embodiments of the present disclosure will be described in greater detail with reference to the drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the suffixes "module" and "unit" of elements herein are used for convenience of description and thus can be used interchangeably and do not have any distinguishable meanings or functions. The singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In describing the present disclosure, if it is determined that the detailed description of a related known function or construction renders the scope of the present disclosure unnecessarily ambiguous, the detailed description thereof will be omitted.

A conventional method of protecting the output terminal of an on-board-charger (OBC) will be described with reference to FIG. 1 and then limitations and problems thereof will be described.

Then, the system for protecting the output terminal of the OBC according to embodiments of the present disclosure will be described with reference to FIG. 2, and then the method of protecting the output terminal of the OBC will be described with reference to FIG. 3. The internal configuration of the apparatus for protecting the output terminal of the OBC will be described in detail with reference to FIG. 4.

FIG. 1 is a diagram illustrating a general system for protecting the output terminal of an on-board-charger (OBC).

As shown in FIG. 1, an OBC 100 and a battery 300 are connected in parallel with an OBC relay 400 interposed therebetween. Another high-voltage part 600 is connected to the OBC 100 in parallel.

The relay controls (i.e., switches) on/off of another electrical circuit according to presence/absence or level of electrical input in correspondence with a predetermined amount of electricity. For instance, the OBC relay 400 performs a switching function for connecting or disconnecting the OBC 100 and the battery depending on whether charging is performed. In other words, the OBC relay 400 cuts off a high voltage for user safety when charging is not performed. When charging begins, the OBC relay 400 is driven and the battery 300 and the OBC 100 are electrically connected, thereby delivering electric energy.

When the OBC 100 and the battery 300 are connected for charging, if a voltage difference occurs across the OBC relay 400, surge voltage and current may be generated between the capacitor of the output terminal of the OBC and the parasitic inductor component on the high-voltage path.

The surge voltage and current may influence an electronic circuit, damaging or destroying the hardware component of the output terminal of the OBC. A conventional method for solving the above-described problem includes a method of decreasing a voltage difference by charging the capacitor of the output terminal of the OBC using a pre-charge resistor included in the battery 300.

When the method of FIG. 1 is used, since the pre-charge resistor included in the high-voltage battery is used, an additional circuit is not required. However, when the capacitor of the input terminal of the high-voltage part 600 is not discharged, charging cannot be performed. Therefore, this method is restricted.

The method of decreasing the voltage difference between the output voltage of the OBC 100 and the voltage of the battery 300 includes a method of adding a pre-charge resistor to the OBC relay 400 to prevent surge voltage and current. In this method, since the pre-charge resistor is included in the output terminal of the OBC 100, charging can be performed without restriction but an additional circuit should be mounted. The additional circuit increases cost. In addition, failure of the OBC relay 400 or complexity of a diagnosis logic may increase.

Accordingly, the present disclosure proposes a method of decreasing surge voltage and current by controlling the voltage of the output terminal of the OBC 100 without using the additional pre-charge resistor.

Hereinafter, the system for protecting the output terminal of the OBC will be described with reference to FIG. 2.

Figure 2:
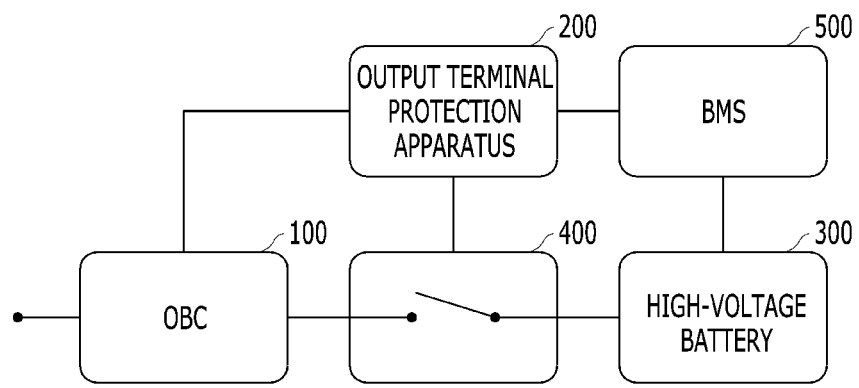
FIG. 2 is a diagram illustrating a system for protecting the output terminal of an OBC according to embodiments of the present disclosure.

FIG. 2 is a diagram illustrating a system for protecting the output terminal of an OBC according to embodiments of the present disclosure.

As shown in FIG. 2, the system for protecting the output terminal of the OBC according to embodiments of the present disclosure may include an OBC 100, an output terminal protection apparatus 200, a battery 300, an OBC relay 400 and a battery management system (BMS) 500.

The components shown in FIG. 2 are not essential but rather are illustrated merely for demonstration purposes. Therefore, the system for protecting the output terminal of the OBC may include more components or fewer components.

Hereinafter, the components will be described in detail.

The OBC 100 is a charger mounted in vehicle, particularly an environmentally friendly vehicle (e.g., an electric vehicle, a hybrid electric vehicle, and the like), and may perform convert electric energy received from an AC power supply into a DC voltage and control charging according to the characteristics of the battery 300.

The output terminal protection apparatus 200 compares the voltage difference between the output voltage of the OBC 100 and the voltage of the battery 300 with a threshold and controls connection between the OBC 100 and the battery 300.

The battery 300 may provide driving power to the vehicle. The battery is a final destination of power when charging is performed and may supply power to the motor and electrical parts of the vehicle when charging is not performed.

In embodiments of the present disclosure, the battery 300 may be a high-voltage battery having relatively high energy density and output density in order to provide driving power.

The OBC relay 400 may perform a switching function for connecting or disconnecting the OBC 100 and the battery 300 depending on whether charging is performed.

The BMS 500 refers to a system for controlling overcharging and overheating of the battery and explosion of the battery due to external impact. In general, a high-capacity battery has a BMS and an electric vehicle also has a BMS.

The BMS monitors the state of the battery using a variety of information. The information indicating the battery state may include a battery voltage, a temperature, the state of charge, the health state of a battery, air flow, the input/output state of current, etc. In addition, the BMS may perform calculation necessary for power supply of the battery based on the above-described information and may be connected to an external device to transmit and receive a variety of information.

Although the BMS is applied as the system for managing and controlling the main battery in embodiments of the present disclosure, the present disclosure is not limited thereto.

Figure 3:
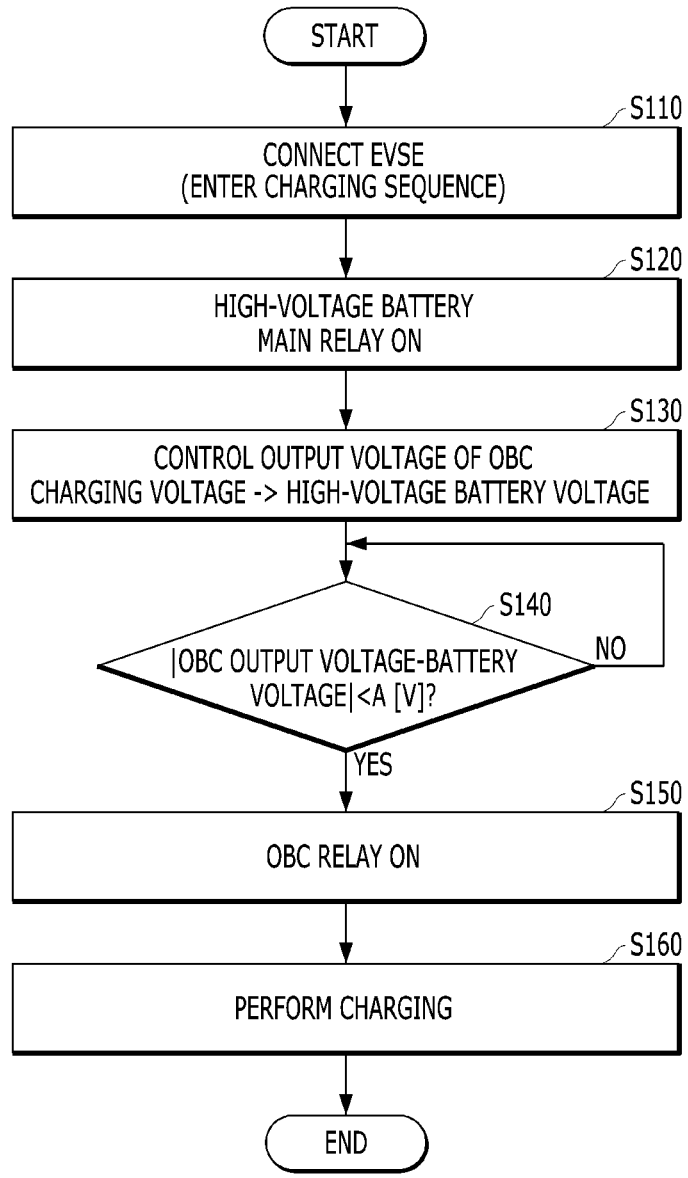
FIG. 3 is a flowchart illustrating a method for protecting the output terminal of an OBC according to embodiments of the present disclosure.

FIG. 3 is a flowchart illustrating a method for protecting the output terminal of an OBC according to embodiments of the present disclosure.

As shown in FIG. 3, electric vehicle supply equipment (EVSE) is connected to the OBC. When the EVSE is connected to the OBC, a charging sequence is performed (S110).

Connection between the EVSE and the OBC may be confirmed by sensing the voltage or current applied to the input terminal of the OBC.

The battery includes a main relay and the output voltage of the OBC is applied to the battery by driving (i.e., turning ON) the main relay (S120). Accordingly, when the charging sequence is performed, the main relay is driven to connect the OBC and the high-voltage battery.

The OBC stores electric energy in the capacitor of the output terminal and an output voltage is generated across the capacitor.

As described above, since surge voltage and current may be generated by the voltage difference between the output voltage of the OBC and the voltage of the high-voltage battery, the voltage difference between the output voltage of the OBC and the voltage of the high-voltage battery should decrease before driving the OBC relay.

In embodiments of the present disclosure, the output voltage of the OBC is controlled to decrease the voltage difference between the output voltage of the OBC and the voltage of the high-voltage battery (S130). The voltage difference may decrease by controlling the voltage across the capacitor of the output terminal of the OBC. The voltage across the capacitor may be mainly controlled by the OBC, because the voltage of the battery has a constant value in order to provide energy to the vehicle.

The OBC may include a power factor corrector (PFC), a DC/DC converter and an output capacitor. The PFC is responsible for decreasing power loss occurring in a process of converting AC power to DC power.

The DC/DC converter is responsible for boosting or dropping the voltage and the output capacitor is responsible for charging electric energy received from the DC/DC converter.

In the charging process using the OBC, the output capacitor is charged with electric energy by the PFC and the DC/DC converter and the output voltage of the OBC is generated across the output capacitor. That is, when the OBC controls the output voltage, the level of the voltage across the output capacitor is controlled. In general, the level of the voltage may be controlled by the charging time.

With elapse of the charging time of the OBC, if the voltage difference across the output capacitor is less than a threshold ("Yes" of S140), it is possible to prevent damage caused due to surge voltage and current generated by the voltage difference.

Accordingly, the output terminal protection apparatus drives the OBC relay to connect the OBC and the battery (S150).

By the voltage generated across the output capacitor of the OBC due to connection, the battery is charged with electric energy (S160).

With elapse of the charging time of the OBC, if the voltage difference across the output capacitor exceeds a threshold ("No" of S140), surge voltage and current may be generated by the voltage difference.

The OBC relay is not driven until the level of the voltage applied to the output capacitor of the OBC becomes substantially equal to the voltage of the battery to wait until the charging time elapses. After an additional charging time has elapsed, when the voltage generated across the output capacitor of the OBC becomes substantially equal to the voltage of the battery and the voltage difference is less than the threshold, the OBC relay is driven.

Figure 4:
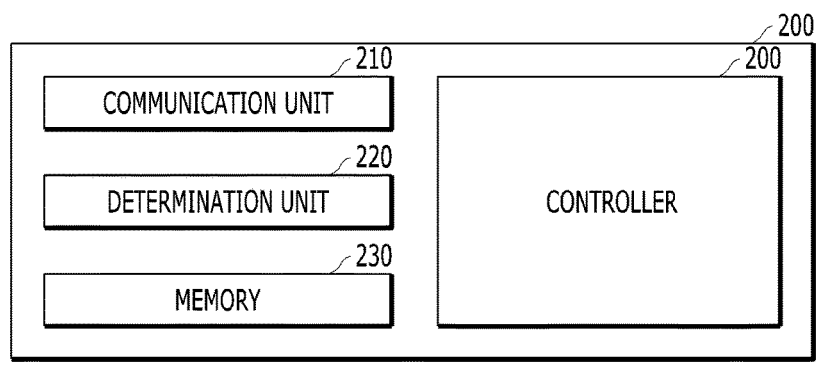
FIG. 4 is a diagram illustrating an output terminal protection apparatus of an OBC according to embodiments of the present disclosure.

FIG. 4 is a diagram illustrating an output terminal protection apparatus of an OBC according to embodiments of the present disclosure.

As shown in FIG. 4, the output terminal protection apparatus of the OBC according to one embodiment of the present disclosure may include a communication unit 210, a determination unit 220, a memory 230 and a controller 240.

The components shown in FIG. 4 are not essential and the output terminal protection apparatus of the OBC may include more components or fewer components.

Hereinafter, the components will be described in detail.

The communication unit 210 transmits and receives a control signal and information for protecting the output terminal to and from the OBC 100, the BMS 500 and the OBC relay 400 included in the system for protecting the output terminal of the OBC.

In embodiments of the present disclosure, the communication unit 210 receives the output voltage from the OBC 100 and receives the voltage of the high-voltage battery 300 from the BMS 500.

The determination unit 220 calculates the voltage difference between the output voltage and the voltage of the battery, which are received from the communication unit 210, and compares the voltage difference with the threshold. If the voltage difference is less than the threshold, the communication unit 210 transmits a driving signal to the OBC relay.

The memory 230 is a storage space and/or a storage region for storing a predetermined program for controlling overall operation of the output terminal protection apparatus 200 of the OBC and data input/output when operation is performed by the program and includes an electrically erasable and programmable read only memory (EEPROM), a flash memory (FM), a hard disk drive, etc.

In embodiments of the present disclosure, the memory 230 may store information on a reference value. The reference value may be predetermined and stored so as to prevent damage of the output capacitor of the OBC. In addition, the memory 230 may store the information and signal exchanged with the OBC 100, the BMS 500 and the OBC relay 400 included in the system for protecting the output terminal of the OBC.

The controller 240 may perform data processing and calculation in order to control the overall operation of the output terminal protection apparatus 200 for of the OBC.

In embodiments of the present disclosure, the controller 240 controls delivery of the voltage information from the communication unit 210 to the determination unit 220 and delivery of the information necessary to perform the function of the determination unit 220 from the memory 230.

Figure 5:
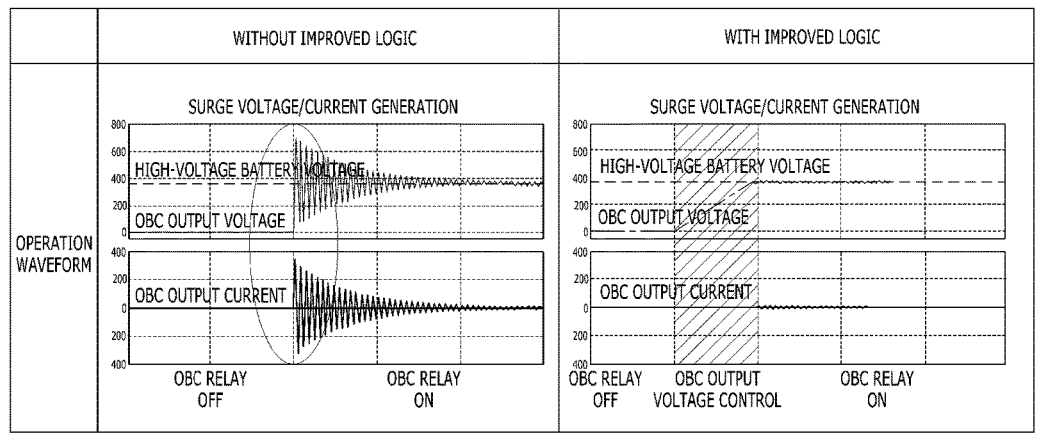
FIG. 5 is a graph illustrating effects of the output terminal protection apparatus of the OBC according to embodiments of the present disclosure.

FIG. 5 is a graph illustrating effects of the output terminal protection apparatus of the OBC according to embodiments of the present disclosure.

As shown in FIG. 5, the effects of embodiments of the present disclosure can be confirmed via comparison between the graph showing the effects of the apparatus without the improved logic and the graph showing the effects of the apparatus with the improved logic.

In the difference between the graphs, in the graph showing the effects of the apparatus without the improved logic, a step of controlling the output voltage of the OBC is located between an OBC relay OFF step and an OBC relay ON step.

As described above, the step of controlling the output voltage of the OBC refers to a step in which, when the voltage difference between the output voltage of the OBC and the voltage of the battery exceeds the threshold, the OBC relay is not driven to prevent surge voltage and current from being generated by the voltage difference.

In the graph showing the effects of the apparatus without the improved logic, surge voltage and current are continuously generated for a predetermined time. In contrast, in the graph showing the effects of the apparatus with the improved logic, the voltage increases until the output voltage of the OBC becomes equal to the voltage of the battery to decrease the voltage difference.

Effects of the method and apparatus for protecting the output terminal of the OBC according to the present disclosure are as follows.

First, by controlling the output voltage of the OBC when entering a charging sequence, it is possible to protect the output terminal of the OBC. Second, since the output terminal of the OBC can be protected without adding a circuit to a conventional OBC, it is possible to decrease cost.

Those skilled in the art will appreciate that the present disclosure may be carried out in other specific ways than those set forth herein without departing from the spirit and essential characteristics of the present disclosure. Accordingly, the above detailed description is not to be construed as limiting the present disclosure in all aspects and be considered by way of example. The scope of the present disclosure should be determined by reasonable interpretation of the accompanying claims and all equivalent modifications made without departing from the present disclosure should be included in the following claims.

What is claimed is:

1. A system for protecting an output terminal of an on-board-charger (OBC), the system comprising:

the OBC configured to apply an output voltage equal to a voltage of a battery to the battery to perform charging of the battery;

an output terminal protection apparatus configured to compare a voltage difference between the output voltage of the OBC and the voltage of the battery with a threshold and control a connection between the OBC and the battery based on the comparison; and an OBC relay driven by the output terminal protection apparatus so as to connect the OBC to the battery when the voltage difference is less than the threshold, wherein the OBC performs the charging of the battery after the OBC is connected to the battery.

2. The system according to claim 1, wherein:
the battery includes a main relay, and
the output voltage of the OBC is applied to the battery by driving the main relay.

3. The system according to claim 1, further comprising a battery management system (BMS) configured to transmit information about the voltage of the battery to the output terminal protection apparatus.

4. The system according to claim 1, wherein:
the battery includes a pre-charge resistor, a pre-charge relay, and a main relay, and
the pre-charge relay is closed before closing the main relay.

5. A method of protecting an output terminal of an onboard charger (OBC), the method comprising:
comparing, by an output terminal protection apparatus of the OBC, a voltage difference between an output voltage of the OBC and a voltage of a battery with a threshold;
driving, by the output terminal protection apparatus, an OBC relay to connect the OBC to the battery when the voltage difference is less than the threshold; and
charging, by the OBC, the battery after the OBC is connected to the battery.

6. The method according to claim 5, wherein:
the battery includes a main relay, and
the output voltage of the OBC is applied to the battery by driving the main relay.

7. The method according to claim 5, further comprising transmitting, by a battery management system (BMS), information about the voltage of the battery to the output terminal protection apparatus, before the comparing of the voltage difference with the threshold.

8. The method according to claim 5, wherein:
the battery includes a pre-charge resistor, a pre-charge relay, and a main relay, and
the pre-charge relay is closed before closing the main relay.

9. An output terminal protection apparatus of an onboard-charger (OBC) comprising:
a communication unit configured to receive information about an output voltage of the OBC and receive information about a voltage of a battery from a battery management system (BMS); and
a determination unit configured to calculate a voltage difference between the output voltage and the voltage of the battery and compare the voltage difference with a threshold,
wherein the communication unit is further configured to transmit a relay control signal to drive an OBC relay to connect the OBC to the battery when the voltage difference is less than the threshold.

10. The output terminal protection apparatus according to claim 9, wherein:
the battery includes a main relay configured to apply the output voltage of the OBC to the battery, and
the communication unit is further configured to transmit a driving signal to the main relay.

11. The output terminal protection apparatus according to claim 9, wherein the communication unit is further configured to receive the information about the voltage of the battery from a battery management system (BMS).

12. The output terminal protection apparatus according to claim 9, wherein:
the battery includes a pre-charge resistor, a pre-charge relay, and a main relay, and
the pre-charge relay is closed before closing the main relay.

13. A non-transitory computer readable medium containing program instructions for protecting an output terminal of an on-board charger (OBC), the computer readable medium comprising:
program instructions that compare, by an output terminal protection apparatus of the OBC, a voltage difference between an output voltage of the OBC and a voltage of a battery with a threshold;
program instructions that drive, by the output terminal protection apparatus, an OBC relay to connect the OBC to the battery when the voltage difference is less than the threshold; and
program instructions that charge the battery after the OBC is connected to the battery.

* * * * *